United States Patent [19]

Chen

[11] Patent Number: 5,808,603

[45] Date of Patent: Sep. 15, 1998

[54] COMPUTER INPUT DEVICE

[76] Inventor: Mei Yun Chen, Fl., 3, No. 2, Lane 42, Hou Kang St., Shih Lin District, Taipei, Taiwan

[21] Appl. No.: 795,641

[22] Filed: Feb. 6, 1997

[51] Int. Cl.$^6$ ..................................................... G09G 5/08
[52] U.S. Cl. .......................... 345/157; 345/163; 345/166
[58] Field of Search .................................. 345/157, 158, 345/163, 166; 74/471

[56] References Cited

U.S. PATENT DOCUMENTS

| | | | |
|---|---|---|---|
| 4,520,240 | 5/1985 | Swindler | 200/5 R |
| 4,670,743 | 6/1987 | Zemke | 345/157 |
| 5,019,677 | 5/1991 | Menen | 178/18 |
| 5,086,296 | 2/1992 | Clark | 345/157 |
| 5,252,952 | 10/1993 | Frank et al. | 345/157 |

Primary Examiner—Brent A. Swarthout
Assistant Examiner—Ashok Mannava
Attorney, Agent, or Firm—Bacon & Thomas

[57] ABSTRACT

A computer input device is comprised of an upper shell a center body and a lower shell, wherein the upper shell is operated so to slide along x axle and y axle, thus the object of controlling the movement and positioning of a cursor on a computer screen is achieved. A structure for detecting the displacements on the direction of x axle and on the direction of y axle is arranged inside the computer input device, and an x axle photoelectric set and a y axle photoelectric set for detecting the action of optic grid piece is also arranged inside the computer input device, and the structure for detecting the displacements on the direction of x axle and on the direction of the y axle is arranged on the same plane by a design of bracing wires, thus the width of the whole structure is became thinner, and volume of the computer input device is reduced so that the computer input device of the present invention may be proper installed on the notebook type personal computer.

7 Claims, 6 Drawing Sheets

COMPUTER INPUT DEVICE

BACKGROUND OF THE INVENTION

1. Field of the Invention

The present invention is related to a positioning control device of computer display cursor, especially, to a device wherein the x axle active optic grid piece and y axle active optic grid piece may be installed on the same plane by arranging ingenious bracing wires so that the limitation in the prior art that two active optic grid pieces must be alternative with each other is overcame, therefore, the width of the whole computer input device may become thinner than before, the volume thereof is greatly reduced, and the user may easily use said computer input device.

2. Description of the Prior Art

The general used cursor control technology in the conventional computer display comprises a keyboard, a mouth, a trace ball, a touch control display, an optic pen, etc. However, it is inconvenient to move and locate a cursor by using a conventional control device, for example, it is ineffective as the cursor is moved by using keyboard; if a conventional mouse is used, it is necessary that the mouse must be moved on the table so that the whole arm is also moved following the movement of the mouth, because the movement of the twist will drive the arm to move, this is an improper design with considering the requirement of ergonomics, so that as the user uses the mouth for a long time, he or she will feel some pain in arm.

For overcoming said defects described hereinbefore, a positioning device of absolute coordinate type is designed. For example, those disclosed in U.S. patent application Ser. Nos. 4,782,327 and 4,935728. However, the volume of the devices described in these Patent Applications is larger, and a complicated control process and circuit interface are required for controlling the cursor. FIG. 1 shows the structure of the device in the U.S. patent application Ser. No. 4,935,728, the top plate 134*a* of the outer shell thereof comprises a rectangular mouth 136*a* which is used as a boundary, a lower sliding plate 108*a*, and a upper sliding plate 110*a*.

Taiwan Patent Application Nos. 84205828, 84205829, "Mechanical Optic Type of Cursor Controlling Device (1) and (2)", and improvement structure of PCT International Patent Application Nos. PCTCN950042 and PCTCN950043; furthermore, Taiwan Patent Application No. 84217771, "Cursor positioning Device"; Taiwan Patent Application No. 85211899, "A Structure of A Cursor Positioning Device Combining with A Keyboard"; All the above Patent applications are appended to the inventor of the present invention.

The object of Taiwan Patent Application No. 85208588 ("The Improvement Structure of Cursor Positioning Device") is to provide a control device of absolute coordinate for moving a cursor of computer display, wherein the movement of display cursor is controlled by movement of absolute coordinate, the structure of said device is shown in FIG. 2. FIG. 2 is a perspective view of one embodiment of the cursor positioning device, the structure of FIG. 2 comprises a left input key 11, a right input key 12, a medium input key 13, a lower shell 14, a upper shell 15, y axle sliding rails 151, 153, x axle sliding rails 152, 154, a frame body 17, a finger control element 3, a top shell 311*a*, a lower shell 313*a*, upper x axle sliding rail 43, upper y axle sliding rail 53 and other components. The moving speed of the active optic grid piece in that invention is proportional to the moving distance of the active optic grid piece and by using a proper firmware the length of active optic grid piece and also the distance of active optic grid piece are abbreviated, but the gap between the different illumination is not reduced, i. e. the cursor may be controlled within a range of 16 mm, therefore, in the mechanical design, the area of interactive means of photoelectric set and optic grid pieces may be abbreviated, and the width of the means may also be reduced, thus said means may be arranged within a notebook type personal computer. Furthermore, in that Patent Application, the photoelectric set is installed on the center of said means so that the optic grid pieces is moved directly, thus the opening in the prior art is unnecessary, and a plate body for covering opening is also omitted (the distance of one side of the plate body is twice of that of the length of center cylinder plus the traveling distance, therefore, the active space and width for moving said means are reduced, and as that invention is arranged within a keyboard or a notebook type personal computer, the plate body using in the prior art is not necessary. Another, the active optic grid piece is unnecessary to be used with a driving axle as that in the prior art, so that the unbalance between the friction of driving axles of x axle and y axle will not induce the loss of signals. In summary, with comparing to the conventional absolute coordinate positioning device, that invention has the follow advantages:

1. The dusts or fluid are prevented from flowing into the keyboard of a generally used computer or a notebook type personal computer.
2. The active area for moving the plate body is saved, the distance of plate body plus that of activity is three times of that of finger controlling element, and the area for moving the plate body is nine times of that for moving said finger controlling element, thus, at least one half of the area occupied by keyboard is saved.
3. The area of active optic grid piece is only one half or fourth of that of the prior art, thus the area occupied by optic grid piece is further reduced, and the effect is similar as that in the prior art.
4. A impulse signal is generated by the overlapping of active optic grid piece and fixing optic grid piece. If each has generated 320 signals, the gap is 25.4M/320=0.08 mm. In this tiny gap, a good straight linear light source is required, for example, laser light emitted diode, but the cost is too high. However, in the conventional low cost light emitted diode, there are some diffusion in the emitted light beam. In the present invention, a small fixing optic grid piece is used, the gap between dark and light illuminations thereof is respective to that of the active optic grid piece, and the distance between the two phases of the optic grid pieces A and B are one fourth of that of one period in the dark and light illuminations, another, a photoelectric transistor including upper and lower pieces are also used in that device, thus an exact 90 degree phase displacement of said optic grid piece is generated, and the active optic grid piece and the fixing optic grid piece are overlapped tightly. The distance between two optic grid piece is very small, thus the light source may be the conventional light emitted diode or the optic grid piece may be directly printed on the photoelectric transistor. Consequently, the present invention may abbreviate the manufacturing process, the timing of light emitted diode may be adjusted, and the cost of parts is saved.
5. In the present invention, active optic grid pieces are used, thus the driving axle used in the conventional mouth is neglected, so that the problem that the unbalance between the friction of driving axles of x axle and y axle which will induce the loss of signals is never generated.

6. There are two kinds of boundary in the present invention, wherein a boundary is directly existed on the active optic grid piece which may be directly identified by digital, so the process is further simplified.
7. In the present invention, there are boundary on the active optic grid piece, further, one of the active optic grid pieces has not only boundary, but also the phase difference between the phases of A and B is 90 degrees, furthermore, within the range of 16 mm, only one operating mode is applied, i.e. the distance that the cursor moves on the display which is proportional to the traveling distance of the cursor moving on the display is controlled precisely, and the resolution variation of display is followed, thus the moving of a cursor is more steady, and the range resolution for moving cursor is also increased. Moreover, on the periphery of the object point, no matter where the cursor moved, the distance resolution in left, right, front and rear sides of said object is also precisely defined, thus the cursor may precisely move to the boundary, and no matter where the cursor is, it can always move back to the original point precisely.
8. The position of the cursor within a display area may be mutually correspondent to that of the finger controlling element within the pointer area, thus the hand and eyes of the user could be properly adjusted to match the requirement of ergonomics.
9. The traveling distance of cursor within a display is proportional to the movement distance of the finger controlling element moving with said pointer area, and the moving speed of the cursor moving within said display is also proportional to the different ones that the finger controlling element within the pointer area so that the cursor is moved steadily within said display, and the joggle of cursor within said display will not occurred.
10. The magnitude for increasing of speed of finger controlling element is positively proportional to the magnitude of the constant value of traveling distance that the finger controlling element is moved within said pointer area.
11. Sometimes a track ball must turn many times for a cursor to move across the whole screen, but in present invention the finger controlling element only moves within the range of 16 mm or a less value, thus only a thumb is needed to control the cursor to travel through the whole screen, therefore the present invention may be properly used in a remote controller or in a notebook type personal computer.

SUMMARY OF THE INVENTION

However, the Taiwan Patent Application No. 85208588, "cursor positioning device" has disclosed a structure having improved much defects about the conventional positioning means. But the inventor of the present invention made further improvement about the cursor positioning means in order that the device is more and more useful to the user.

The computer input device of the present invention, by the ingeniously designed bracing wires, the conventional limitation about the "immprovement structure of cursor positioning device" that the x axle active optic grid piece and the y axle active optic grid piece must be intersected is overcame, the present invention has the following advantages with comparing to the conventional cursor positioning device:

(1) Since two optic grid pieces are not intersected with each other so that they may be arranged on the same plane, thus the width of the computer input device may be greatly reduced.

(2) The two optic grid pieces may be parallel arranged in one direction, thus it is only needed in one direction, therefore, in the conventional structure, two travel directions (x direction and y direction) may be reduced, i.e. the active space of the optic grid pieces is decreased, thus the inner space is more larger than before, and the additional space may be used to arrange to components of control circuit, thus the circuit elements may be arranged on the same layer with the two optic grid pieces, instead to be arranged in different layer with the optic grid pieces as in the conventional structure, therefore, the width of the computer input device of the present invention is further reduced.

(3) Because the two optic grid pieces is pulled by bracing wires, the opening on the "cursor positioning device" may be abbreviated, not only the dusts may be prevent from passing into the device, but also the distance moved by the control elements is also reduced.

Accordingly, from the description hereinabove, by the ingeniously designed, the width of the whole structure is became thinner, and volume of the computer input device is reduced so that the computer input device of the present invention may be proper installed on the notebook type personal computer, and the advantages of "cursor positioning device" of the prior art is also maintained, thus the computer input device of the present invention has great improvement than the conventional "cursor positioning device".

BRIEF DESCRIPTION OF THE DRAWINGS

The invention, as well as its many advantages, may be further understood by the following description and drawings in which:

FIG. 7 is a cross sectional view taken along the line 7—7 of FIG. 5a.

SYMBOLS ILLUSTRATED

Figure 1:
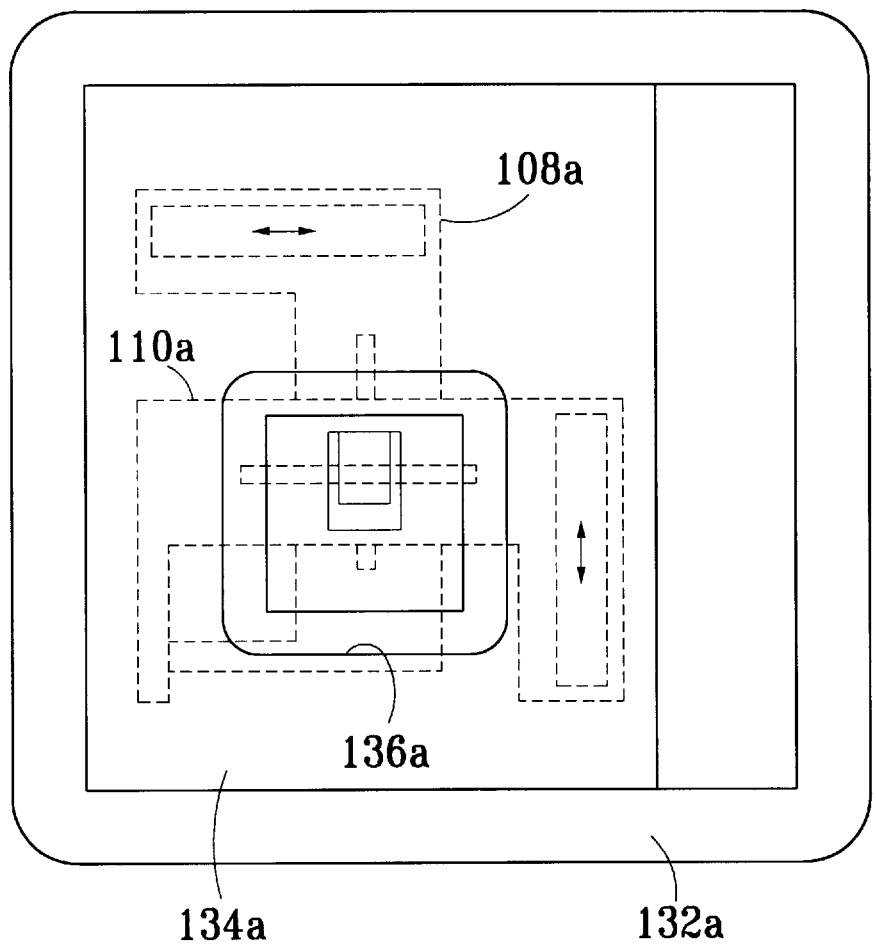
FIG. 1 is a schematic view of the coordinate plate in the prior art.

Description of the Numbers in FIG. 1

Figure 2:
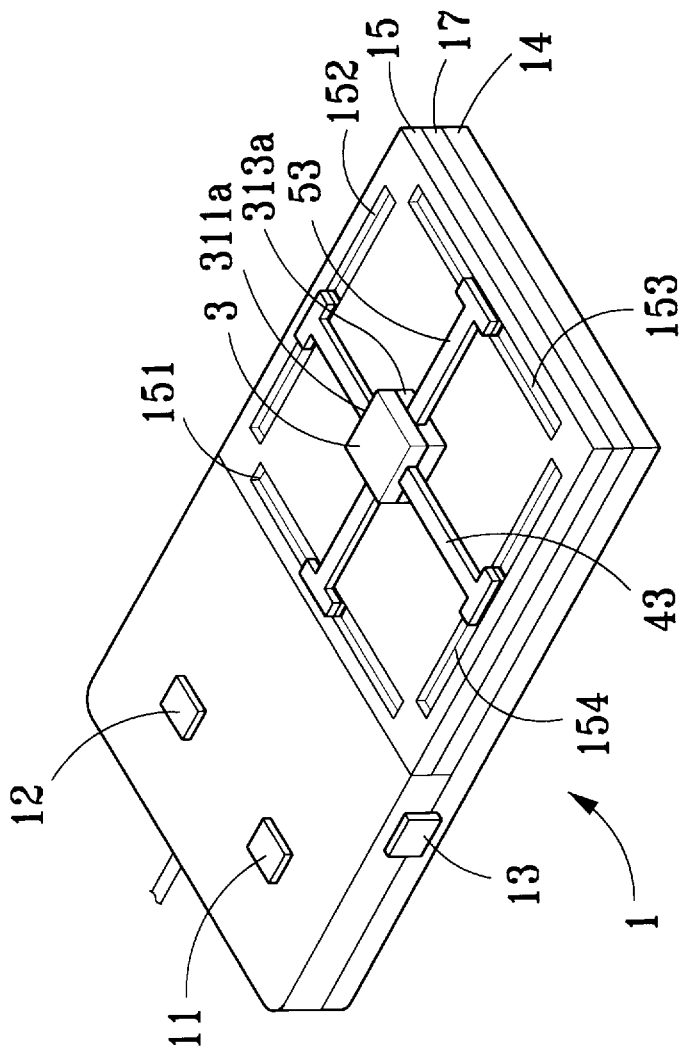
FIG. 2 is a structural view of the "cursor positioning device" in one embodiment of Taiwan Patent Application No. 842117771.

132a outer shell
134a top plate
136a rectangular opening
108a lower sliding plate
110a upper sliding plate Description of the Numbers in FIG. 2

1 positioning device
11 left input key
12 right input key
13 medium input key
14 lower shell
15 upper shell 151 y axle sliding rail
152 x axle sliding rail
153 y axle sliding rail
154 x axle sliding rail
17 frame body
3 finger controlling element
311a top shell
313a lower shell
43 upper x axle sliding bar
53 upper y axle sliding bar Description of the Numbers in the Present Invention 10 uppers hell
11 upper shell planking
111 input key
112 buckling block
12 upper shell bottom plate
122 buckling mouth
123 bracing wire
124 bracing wire
20 medium body
21 top cover
22 bottom base
221 hole
222 hole
223 groove
224 groove
23 sliding bar
231 bracing wire
232 bracing wire
233 slot
30 lower shell
31 shell planking
311 buckling block
32 lower shell bottom plate
321 buckling hole
323 control circuit
33 (x axle) active optic grid piece
331 optic grid piece section
332 base cover
3321 groove
333 light emitted diode
334 fixing optic grid piece
335 lower base
336 (x axle) photoelectric set
3371 conduit
3372 conduit
3373 conduit
3374 conduit
3375 conduit
3376 conduit
34 (y axle) active optic grid piece
341 optic grid piece section
342 base cover
3421 groove
343 light emitted diode
344 fixing optic grid piece
345 lower base
346 (y axle) photoelectric set
3471 conduit
3472 conduit
3473 conduit
3474 conduit
3475 conduit
3476 conduit

DETAILED DESCRIPTION OF THE PREFERRED EMBODIMENT

Figure 3:
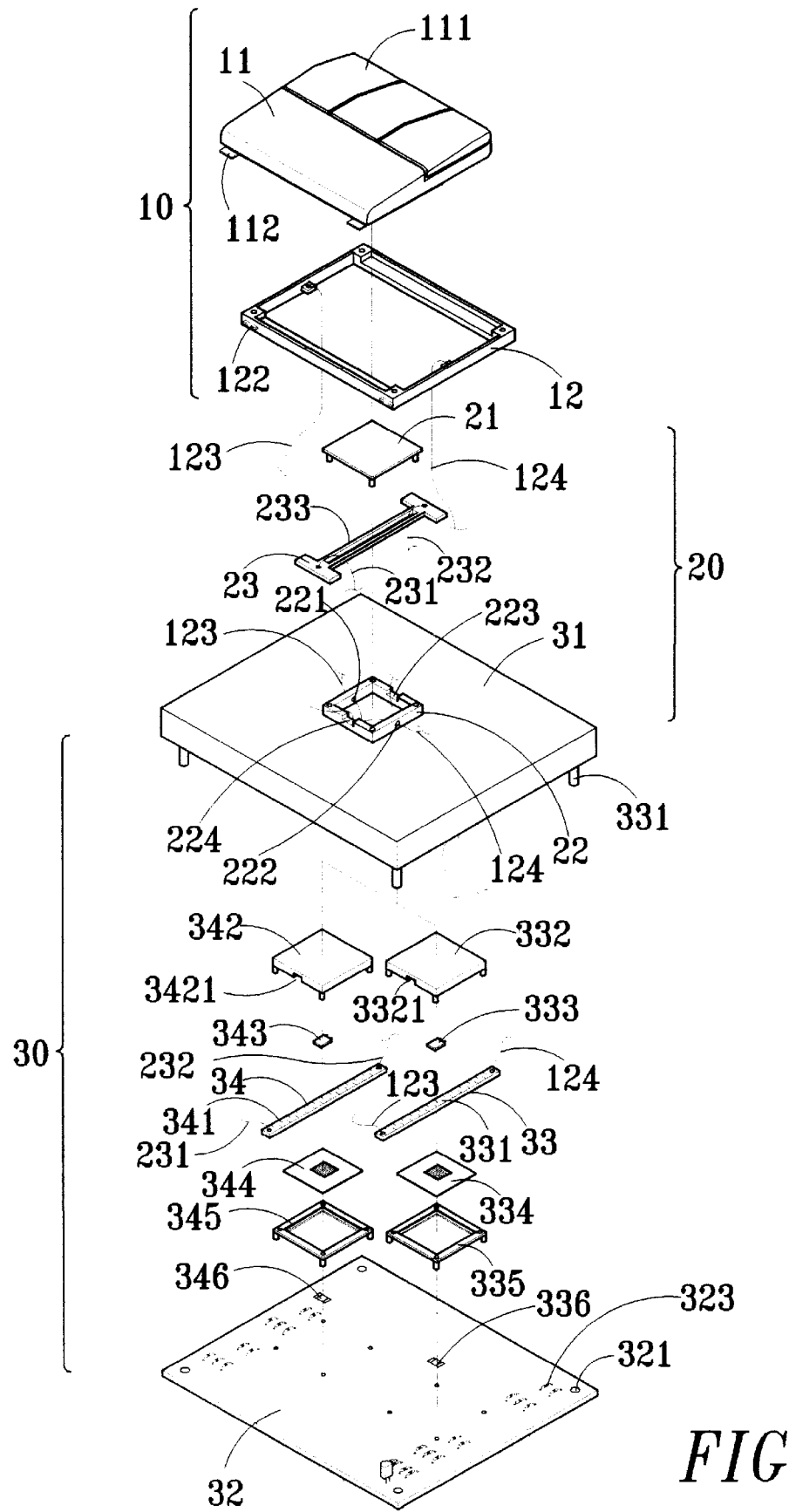
FIG. 3 is the exploded view of components of the present invention.

Now referring to FIG. 3, it is an exploded view of the computer input device of the present invention. The structure of the computer input device is mainly comprised of an upper shell 10, a center body 20 and a lower body 30, wherein:

The upper shell 10 is divided into an upper shell planking 11 and an upper shell bottom plate 12. Middle, left, and right input keys 111 and a buckle block 112 are installed on the upper shell planking 11, and a buckle mouth 122 which may be combined with the buckle block 112 of the upper shell planking 11 is installed on the upper shell bottom plate 12. Two bracing wires 123 and 124 are connected on the centers of the right and left sides of the upper shell bottom plate 12, and grooves are installed on the front and rear sides thereof.

The center body 20 is comprised of a top cover 21, a lower base 22 and a sliding bar 23. Said lower base is a hollow buckled base on the flange of center of a shell planking 311, and the top cover may be engaged therewith. The left and right side walls of the lower base 22 are installed with holes 221 and 222, and the front and rear walls thereof are installed with grooves 223 and 224. The center of sliding bar 23 is a bar body the center of which is installed a slot 233 which is penetrated inside the grooves 223 and 224, and the two ends of sliding bar 23 is crossed over the slot of an upper shell lower base 12, and which may be slid between the top cover 21 and the lower base 21 and on the grooves of the upper shell bottom plate 12. Two bracing wires 231 and 232 are connected on the two ends of sliding bar 23, and the bracing wires 231 and 232 are penetrated downwards through the slot 233 of sliding bar 23 and then through the shell planking 311 so to pull an active optic grid piece inside the lower shell 30 to move forwards and backwards, while and bracing wires 123 and 124 connected on the upper shell bottom plate 12 are penetrated through holes 221 and 222 on the left and right sides of lower bases 22, and then being penetrated through shell cover plate 311 so to pull another active optic grid piece 33 within the lower shell 30 to move forwards and backwards.

The lower shell 30 is divided into a shell planking 31 and lower shell bottom plate. A buckling block 311 is installed on the shell planking 31, and a flange hollow buckle base is installed on the center thereof. The bracing wire 123, 124, 231, and 232 are penetrated through the hollow buckle base into the inside of lower shell 31, while a buckling base 321 is installed on the lower shell lower base 32, which can be connected with the buckling block 311 of shell planking 31. Structures for detecting the respective movements of x axle and y axle is installed on the medium of the shell planking 31 and lower shell bottom plate 32. The two structures are comprised of respective base covers 332 and 342, light emitted diodes 333 and 343, active optic grid pieces 33 and 34, fixing optic grid pieces 334 and 344, lower bases 335 and 345 and photoelectric sets 336 and 346. Wherein the front and rear sides of the base cover 33 are installed with groove 3321, the base cover 332 is engaged with the lower base 335, while the lower bases 335 and 345 are connected a lower shell bottom plate 32. A control circuit 323 is installed on the lower shell bottom plate 31. The active optic grid piece 33 is penetrated through the groove 3321 of the base cover 332 so to slide freely between the base cover 332 and the lower base 335. The light emitted diode 333 is installed between the base cover 332 and the active optic grid piece 33, and the fixing optic grid piece 334 is installed between the active optic grid piece 33 and lower base 335, while photoelectric set 336 is installed between the fixing optic grid piece 334 and lower base 335. The active optic grid piece have an optic grid piece section 331 which are two rows of separated optic grid pieces for matching with two photoelectric transistors of photoelectric set 336 to detect the displacement and direction of said active optic grid piece 33. Since in this embodiment the bracing wires 123 and 124 are respectively connected with the front and rear ends of active optic grid piece 33, when the shell 10 is moved to left or right along the x axle, the active optic grid piece will be driven to moved forwards and backwards, therefore, the active optic grid piece 33 is an x axle active optic grid piece, and the photoelectric set is an x axle photoelectric set, which are used to detect the displacement of the upper shell 10 moving along x axle. A groove 3421 is installed on the front and rear sides of the base cover 342 which is engaged with the lower base 345. The active optic grid piece 34 is penetrated through the groove 3421 of the base cover 342 so to slide freely between the base cover 342 and the lower base 345. The light emitted diode 343 is installed between the base cover 342 and the active optic grid piece 34, and the fixing optic grid piece 344 is installed between the active optic grid piece 34 and the lower base 345, while the photoelectric set 346 is installed between the optic grid piece 344 and the lower base 345. The active optic grid piece have an optic grid piece section 341 which is formed by two rows of separated optic grid pieces for matching with two photoelectric transistors of photoelectric set 346 to detect the displacement and direction of said active optic grid piece 34. Since in this embodiment the bracing wires 231 and 232 are respectively connected with the front and rear ends of active optic grid piece 34, when the shell 10 is moved to left or right along the y axle, the active optic grid piece will be driven to move forwards and backwards, therefore, the active optic grid piece 34 is a y axle active optic grid piece, and the photoelectric set 346 is a y axle photoelectric set, which are used to detect the displacement of the upper shell 10 moving along y axle.

Figure 4:
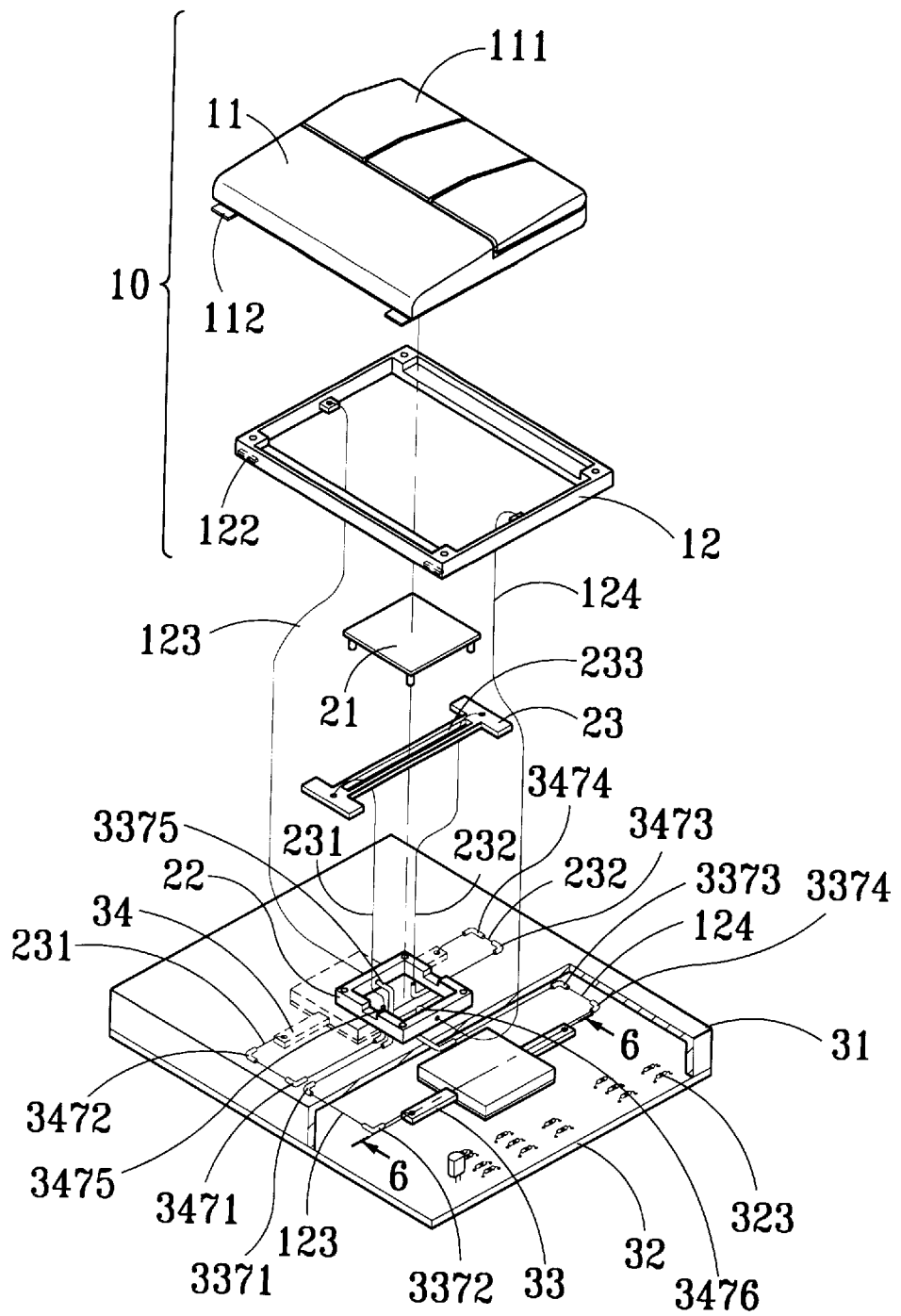
FIG. 4 is the partial assembly perspective view of the present invention.

Now referring to FIG. 4, it is a partial composite perspective view of the present invention, it is clear from FIG. 4 that a conduit is installed on the proper position of the lower shell 30 and the lower base 22, which is used to facilitate the movement and rotation of a bracing wire pulled by a force so to drive fluently and linearly x axle active optic grid piece 33 and y axle active optic grid piece 34, thus the movement of a cursor may be controlled exactly. Wherein the bracing wire 123 is passed through conduits 3375, 3371 and 3372; the bracing wire 124 is passed through conduits 3376, 3373 and 3374; the bracing wire 231 is passed through conduits 3475, 3471 and 3472; and the bracing wire 232 is passed through conduits 3476, 3473 and 3474.

Figure 5:
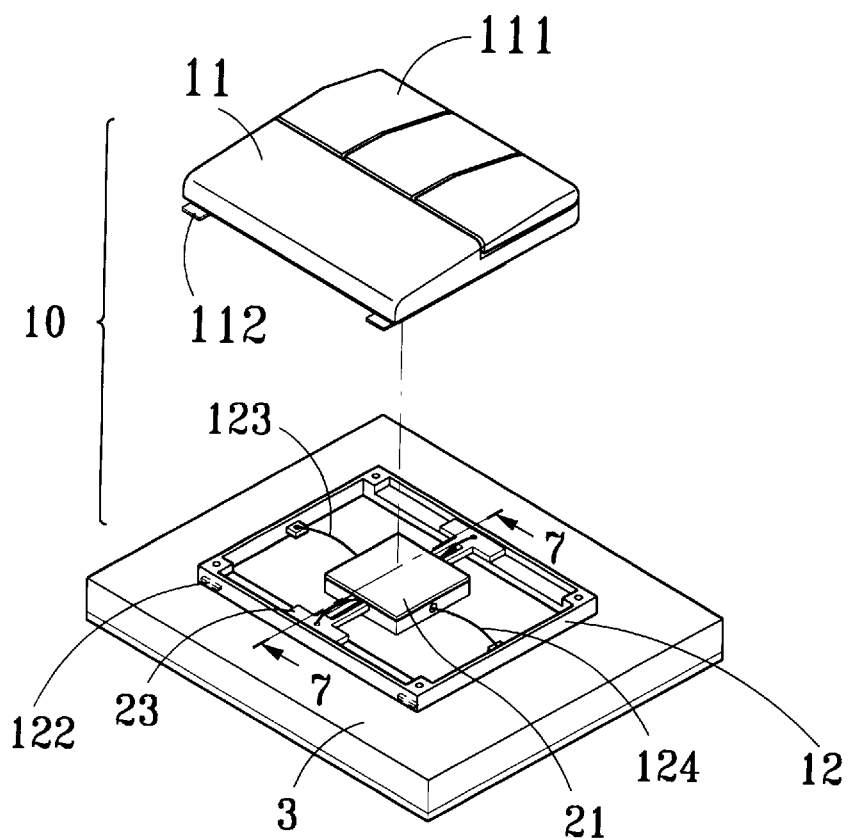
FIG. 5 is the perspective view of the present invention.
Figure 7:
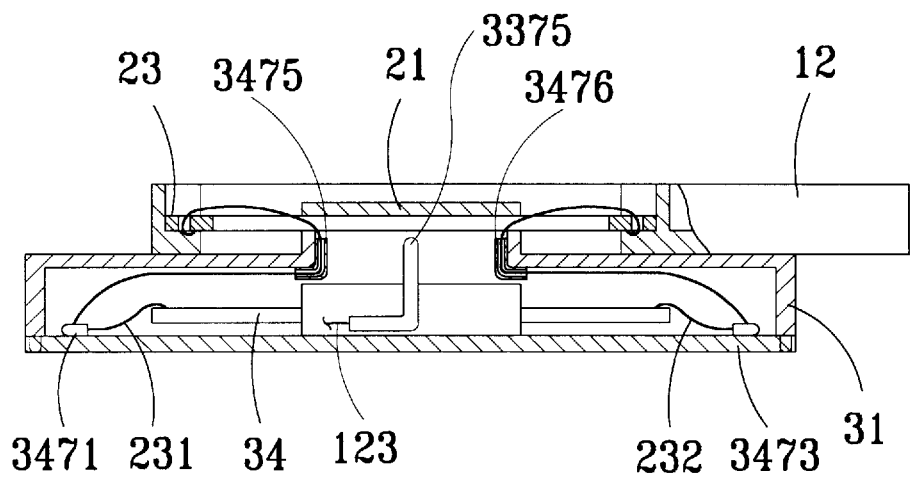

FIG. 5 is a perspective view of the present invention and FIG. 7 is a cross sectional view taken along the line 7—7 of FIG. 5. These figures show that by installing the bracing wire, the volume and width of the present invention is reduced to the minimum and meets the requirement of precise positioning.

Figure 6:
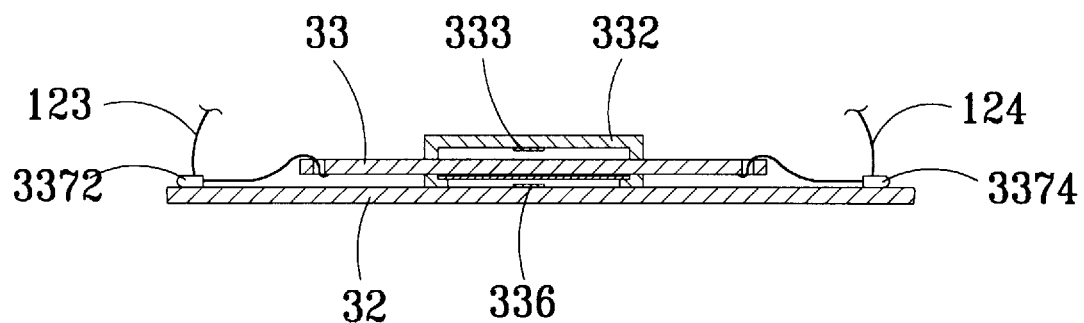
FIG. 6 is a cross sectional view taken along the line 6—6 of FIG. 4.

FIG. 6 is the cross section view of the present invention taken along the line 6—6 of FIG. 4, and shows the interactive relation between the bracing wire and the active optic grid piece. As the upper shell 10 is manually pulled to move along x direction, the bracing wire 124 is pulled a rightward pulling force applied by the upper shell 10, since the bracing wire 124 is connected on the front end of the x axle active optic grid piece through conduits 3376, 3373, and 3374 so that the x axle active optic grid piece 33 is slid forwards by the applying force, while the upper shell 10 is pulled to slide along the direction of negative x axle, a leftward force is applied on the bracing wire 123 by the upper shell 10, since the bracing wire 123 is passed through conduits 3375, 3371 and 3372 to connect on the rear end of the x axle active optic grid piece 33, thus the x axle active optic grid piece 33 is moved backwards by the applying force. Similarly, As the upper shell 10 is manually pulled to move along y direction, the bracing wire 232 is pulled a forward pulling force applied by the upper shell 10, since the bracing wire 232 is connected on the front end of the y axle active optic grid piece 34 through conduits 3476, 3473, and 3474 so that the y axle active optic grid piece 34 is slid forwards by the applying force, while the upper shell 10 is pulled to slide along the direction of negative y axle, a backward force is applied on the bracing wire 231 by the upper shell 10, since the bracing wire 231 is passed through conduits 3475, 3471 and 3472 to connect on the rear end of the y axle active optic grid piece 34, thus the y axle active optic grid piece 34 is moved backwards by the applying force. Because of the substantial movement, generally the bracing wire is not moved only in x axle or in y axle, however, the movement along any direction may be considered as the combination effect of movements along x axle and y axle, thus, it is only needed to transfer the distances about the movements along x axle and y axle to a computer so that the movement and positioning of the cursor on the computer display may be manually controlled by movement of the upper shell 10.

Because the an optic pulse will be generated by light emitted diodes 333 and 334 through the x axle active optic grid piece 33 and the y axle active optic grid piece 34, after this optic pulse is passed through the fixing optic grid piece 334 and 344, and is received by two photoelectric transistor 336 and 335, respectively, by the number of optic pulse, the displacement of x axle and y axle the two active optic grid piece 33 and 34 may be derived, and which is transferred to a computer by the conversion of associated control circuit for control the cursor position on the computer display.

In above embodiment, the object for installing the sliding bar is to prevent the upper shell 10 to separate from the center body 20. In the embodiment, the two active optic grid piece 33 and 34 may be parallel or not parallel to be installed on the same plane, and the bracing wire 123 and 124 of the upper shell bottom plate 12 may be installed on the front and rear ends, and the positions of the holes 221, 222 and grooves 223 and 224 can be changed by each other, therefore, the object of detecting the displacements about the movements of x axle and y axle are still achieved, but now the active optic grid piece 33 is the y axle active optic grid piece, and the active optic grid piece 34 is the x axle active optic grid piece.

Besides, instead the two base cover 332 and 342 are installed on the lower shell 30, the shell planking 31 of the lower shell 30 is overlapped directly on the two lower bases 335 and 345 for reducing the width of lower shell.

The optic grid piece section 331 and 341 of two active optic grid piece 33 and 34 may be designed as three separated optic grid pieces for matching with a photoelectric set having three photoelectric transistors, a therefore the resolution will be increased to 1.5 times with comparing to the photoelectric section with two separated optic grid pieces for matching with a photoelectric set having two photoelectric transistors.

FIG. 6 is the perspective view of the present invention, it is clear that because of the installation of bracing wires, the volume and width of the present invention is reduced to the minimum and is matched the requirement of exact positioning.

It is appreciated for the aforementioned description, the computer input device of the present invention is not only to have the advantage of cursor positioning device, but also by using the ingenious bracing wire design, the conventional imitation that the x axle active optic grid piece and y axle active optic grid piece must be alternative arranged is overcame, thus the width of whole structure is further became thinner and the volume thereof is further minimized, thus it becomes an easy use computer input device to user.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A computer input device which comprises:

an upper shell which is divided into an upper shell planking and an upper shell bottom plate, a medium key, a right key, a left key and a buckling block being installed on the upper shell planking, the upper shell bottom plate being installed with a buckling hole for being combined with said upper shell planking, bracing wires being connected between the centers of the right and left sides of said upper shell bottom plate, and there being grooves installed on the front and rear side walls thereof;

a center body comprising a top cover, a lower base and a sliding bar, the lower base being a flange hollow buckling base locating on the center of shell planking, the top cover being engaged with the lower base the right and left side walls of which being installed with holes and the front and rear walls being installed with grooves, and a groove being positioned on the center of the sliding bar, which is penetrating through said groove, the two ends of the sliding bar being crossed over the groove of the upper shell bottom plate so to slide freely between the top cover and the bottom base and on the groove of the upper shell, there are bracing wires connecting between the two ends of the sliding bar which is penetrated downwards through the slot of sliding bar and then is penetrating through the shell planking so to pull an active optic grid piece inside the lower shell to move forwards and backwards, while the bracing wires connected on the upper shell bottom plate being penetrated through holes on the left and right sides of lower bases, and then being penetrated through shell cover plate so to pull another active optic grid piece within the lower shell to move forwards and backwards; and a lower shell being divided into a shell planking and a lower shell bottom plate, a buckling block being installed on the shell planking, and a flange hollow buckle base being installed on the center thereof, the bracing wires of the two ends of the sliding bar and the bracing wires on the center of the right and left sides of upper shell bottom plate being penetrated through the hollow buckle base into the inside of lower shell, while a buckling base being installed on the lower shell lower base, which can be connected with the buckling block of shell planking, structures for detecting the respective movements of x axle and y axle being installed on the medium of the shell planking and lower shell bottom plate, the two structures being comprised of respective base covers, light emitted diodes, active optic grid pieces, fixing optic grid pieces, lower bases and photoelectric sets, wherein the front and rear sides of the base cover are installed with groove, the base cover is engaged with the lower base, while the lower bases are connected with a lower shell bottom plate, the two active optic grid piece is penetrated through the groove of the base cover so to slide freely between the base cover and the lower base, the light emitted diode is installed between the base cover and the active optic grid piece, and the fixing optic grid piece is installed between the active optic grid piece and lower base, while photoelectric set is installed between the fixing optic grid piece and lower base, the active optic grid piece have a optic grid piece section which are fromed by two rows of separated optic grid pieces for matching with two photoelectric transistors of photoelectric set to detect the displacement and moving direction of said active optic grid piece, wherein by the aforementioned structure, the two active optic grid piece is pulled by the ingeniously designed bracing wires, therefore the conventional limitation that the two active optic grid piece must be alternative arranged is overcame so that the two active optic grid pieces may be parallel installed on the same plane, thus not only the width and volume of the whole device and the range for the movement of hand are greatly reduced, but also the computer input device of the present invention may be properly installed on the notebook type personal computer.

2. The computer input device as recited in claim 1, wherein a plurality of conduits are installed on the proper position of the lower shell and the lower base, which is used to facilitate the movement and rotation of a bracing wire pulled by a force so to drive fluently and linearly x axle active optic grid piece and y axle active optic grid piece, thus the movement of a cursor could be controlled exactly.

3. The computer input device as recited in claim 1, wherein the two active optic grid pieces may be tiltly installed on the same plane.

4. The computer input device as recited in claim 1, wherein a control circuit may be installed on the lower shell bottom plate.

5. The computer input device as recited in claim 1, wherein the bracing wires may be changed to be installed on the front and rear ends, and the positions of the hole and the groove on the top cover of the center body may be changed with each other.

6. The computer input device as recited in claim 1, wherein the two base cover installed on the lower shell may be deleted, while the shell planking of the lower shell is directly overlapped on the two bottom base, thus the width of lower shell is reduced.

7. The computer input device as recited in claim 1, wherein the photoelectric section of the two active optic grid piece may be designed as three rows of optic grid piece which are alternative arranged with each other and each of the three rows is matched with a photoelectric set having three photoelectric transistor, thus the resolution is increased.

* * * * *